Patented Jan. 29, 1935

1,989,226

UNITED STATES PATENT OFFICE 1,989,226

TREATMENT OF RUBBER

Clyde Coleman, Passaic, N. J., assignor, by mesne assignments, to United States Rubber Company, New York, N. Y., a corporation of New Jersey No Drawing. Application September 30, 1932, Serial No. 635,607

3 Claims. (Cl. 18—53)

This invention relates to the treatment of rubber and similar materials and more particularly to a method of improving the properties of rubber products by incorporating therewith diamino diaryl methanes.

An object of the invention is to provide a class of materials which are stable, and which are effective age-resisters in stocks containing a vulcanizing agent and an organic accelerator, both before and after vulcanization. A further object is to provide a class of organic accelerators which are relatively slow in their action, usable themselves, without the addition of other organic accelerators, and which are therefore valuable for use in the vulcanization of relatively massive or thick rubber articles requiring a long slow cure, such as pneumatic truck and bus tires and solid truck tires.

Exemplary of these materials are p,p'-diamino diphenyl methane, 2,4'-diamino-5-methyl diphenyl methane, 4,4'-diamino-3-methyl diphenyl methane, and others responding to the formula

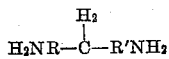

wherein R and R' may be the same or different aryl radicals, e. g. phenyl, o-chlorophenyl, p-chlorophenyl, o-tolyl, p-tolyl, xenyl, alpha-naphthyl, beta-naphthyl, etc. The central carbon atom in the formula is joined to R or R' in the position para to the nitrogen unless that position is blocked by the presence of another substituent, in which case the linkage is probably to a position ortho to the nitrogen. Such materials wherein R and R' are different aryl radicals, or wherein R and R' are benzene groups containing different substituents besides the methylene and amino groups, may be termed mixed or unsymmetrical diamino diaryl methanes.

The reaction for preparation of these materials is typified with aniline and formaldehyde as follows:

(A) $C_6H_5NH_2+CH_2O \rightarrow C_6H_5-N=CH_2+H_2O$ (B) 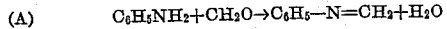

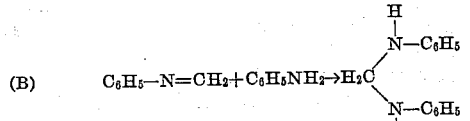
methylene aniline   diphenyl diamino methane
(or, methylene di-anilide)

(C) 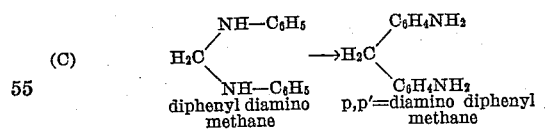
diphenyl diamino   p,p'=diamino diphenyl
methane             methane Reactions B and C proceed, in order, when methylene aniline is dissolved in excess aniline and aniline hydrochloride added. The same conditions are brought about by dissolving methylene aniline in a sufficiently large amount of aniline and adding hydrochloric acid whereby to form aniline hydrochloride with a portion of the free aniline. The change to diphenyl diaminomethane is brought about by the action of aniline upon methylene aniline, and the rearrangement to diamino diphenyl methane by the agency of hydrochloric acid or aniline hydrochloride. The aniline hydrochloride may by its dual nature perform both changes, in which event the product may be viewed as the completely inverted reaction product of formaldehyde-aniline (methylene aniline) and aniline hydrochloride. The presence of a mineral acid either free or combined as in the aniline hydrochloride is necessary to the rearrangement.

It will be noted that there are two inventions involved in this application, (1) the appreciation and use of the above materials as practical antioxidants when associated with fast organic accelerators in rubber stocks to ultimately provide desirable vulcanized rubber products—and (2) the appreciation and use of the materials as the sole accelerators in stocks requiring a long flat curing range such as truck tires mentioned above. In the former practice the action of acceleration is subordinated to the faster accelerating action of the prime accelerator which is chosen for this purpose, and the role of the above materials is essentially as an antioxidant and activator for the prime accelerator. When used as antioxidants the materials also give improved abrasion resistance to articles that are usually subjected to much wear in use, such as tire treads. It has also been found that when the materials are used as the sole added organic accelerator for skim coat stocks, tires and other articles, that these articles withstand flexing tests, both green and aged, unusually well.

Illustrative of (1) are the following examples in which the parts are by weight:

372 grams (about 4 moles) of aniline are treated with 80 grams of 37.5% formaldehyde solution (about 1 mole of formaldehyde). Heat is evolved and the temperature is kept at about 40° C. for about 2 hrs. This reaction by the formaldehyde and about one-fourth of the aniline present produces methylene aniline which remains in solution in the excess of anilne. At the end of that time the water present is separated and 6.47 grams of aniline hydrochloride or 5 cc. of concentrated hydrochloric acid, more or less, are added to the aniline solution. The mixture is then kept at about 80° C. for about 24 hrs. during which time the methylene aniline reacts with a part of the free anilne to form 4—4' diamino diphenyl methane. At the end of the 24 hours a sufficient quantity of sodium hydroxide dissolved in a small amount of water is added for the purpose of neutralizing the hydrochloric acid. The water and free aniline are then removed by vacuum or other distillation. The non-volatile residue consists essentially of 4—4' diamino diphenyl methane.

1.5 parts of 4—4' diamino diphenyl methane, 100 parts of rubber, 10 parts of zinc oxide, 3 parts of sulphur, .3 parts of heptaldehyde aniline condensation product diluted with spindle oil, are mixed on the mills in the usual manner and vulcanized in a press under 40 lbs. steam pressure for 30 and 60 minutes. A similar stock is also made up to which no anti-oxidant is added. The green tensiles of these stocks together with their tensiles after ageing for 24 hrs. at 212° F. and for 384 hrs. at 140° F. in oxygen under a pressure of 300 lbs. per sq. in. are tabulated below:

|  |  | No anti-oxidant | 1.5 parts 4-4' diamino diphenyl methane |
|---|---|---|---|
| Green | 30' | 2645 | 3040 |
|  | 60' | 3015 | 3345 |
| Aged 24 hrs. at 212° F. | 30' | 655 | 1695 |
|  | 60' | 805 | 1945 |
| 384 hrs. in ox. at 140° F. under 300# per square inch | 30' | 1350 | 2875 |
|  | 60' | Too poor to test | 2000 |

Illustrative of (2) are the following examples:

The following mixes of rubber and other substances as shown in the table below were prepared and heated at 45 pounds steam pressure in a mold as indicated; the tensile strength is shown opposite the figure expressing the time of heating in minutes.

|  | A | B | C | D |
|---|---|---|---|---|
| Rubber | 100 | 100 | 100 | 100 |
| Zinc oxide | 110 | 110 | 110 | 110 |
| Carbon black | 25 | 25 | 25 | 25 |
| Sulfur | 5 | 5 | 5 | 5 |
| Hexamethylene tetramine | .62 |  |  |  |
| 4,4' diamino diphenyl methane |  | 1.25 |  |  |
| 2,4'-diamino-5-methyl diphenyl methane |  |  | 1.25 |  |
| 4,4'-diamino-3-methyl diphenyl methane |  |  |  | 1.25 |
| 30' at 45# | 2745 | 2463 | 2468 | 2747 |
| 45' at 45# | 2983 | 2543 | 2575 | 2867 |
| 60' at 45# | 2965 | 2955 | 2978 | 3077 |
| 75' at 45# | 3038 | 3007 | 2998 | 2935 |
| 90' at 45# | 3003 | 2873 | 2973 | 2993 |

It is seen that 1.25 parts of the three diamino diaryl methanes are substantially equal to .62 part of hexa methylene tetramine in accelerating strength.

The methods for making 4,4'-diamino diphenyl methane are well known. The other new accelerators may be made by similar methods, e. g., 2,4'-diamino-5-methyl-diphenyl methane may be made by treating methylene-para-toluidine with aniline and hydrochloric acid and heating the mixture for several hours on the steam bath. Alternatively, it may be made by treating methylene-aniline with p-toluidine and hydrochloric acid in a similar manner.

Likewise, 4,4' - diamino -3 - methyl - diphenyl methane is made by heating methylene-aniline with ortho-toluidine and hydrochloric acid, or by heating methylene-o-toluidine with aniline and hydrochloric acid.

The invention is not limited to the three chemicals shown above but includes all chemicals of the general formula,

$$H_2N-R-CH_2-R'-NH_2$$

where R and R' are both aromatic radicals, which may or may not be substituted by other groups besides the amino groups, such as methyl, phenyl, halogen, etc., or condensed benzene rings as in the case where R and/or R' are naphthyl groups. Further examples of such compounds are:

3,3'-diamino-5,5'-dimethyl-diphenyl methane 4,4'-diamino-3,3'-dimethyl-diphenyl methane, and 2,4'-diamino-5,3'-dimethyl-diphenyl methane.

The materials may be incorporated as such with the rubber in its plastic form on the mill, or by adding it while in solution.

It is to be understood that while in the examples of rubber mixes given above certain vulcanizing ingredients are disclosed, the invention is not limited to the use of these but may be carried out by the use of other suitable vulcanizing agents, fillers, or in the case of (1) above with other accelerators than heptaldehyde-aniline. Instead of incorporating the anti-oxidant in rubber on the mill, the rubber article may be dipped in a benzol solution of the anti-oxidant or other suitable solution of the antioxidant. Also with the detailed disclosure above given, it is obvious that modifications will suggest themselves, and it is not desired to limit the invention otherwise than as set forth in the appended claims.

Having thus described my invention, what I claim and desire to protect by Letters Patent is:

1. A process of accelerating the vulcanization of rubber which comprises vulcanizing rubber containing a vulcanizing agent and a metallic oxide with a diamino diaryl methane as the sole added organic accelerator material.

2. A process of accelerating the vulcanization of rubber which comprises vulcanizing rubber containing a vulcanizing agent and zinc oxide with p,p'-diamino-diphenyl methane as the sole added organic accelerator material.

3. A process which comprises vulcanizing rubber containing a vulcanizing agent and a metal oxide with a compound of the general formula $H_2NR-CH_2-R'NH_2$ where R and R' may be the same or different aryl radicals as the sole added organic accelerator material.

CLYDE COLEMAN.